(12) United States Patent
Yamazaki

(10) Patent No.: US 9,842,259 B2
(45) Date of Patent: Dec. 12, 2017

(54) CAPTURED IMAGE RECOGNITION DEVICE, CAPTURED IMAGE RECOGNITION SYSTEM, AND CAPTURED IMAGE RECOGNITION METHOD

(75) Inventor: Ryuji Yamazaki, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 464 days.

(21) Appl. No.: 13/979,864

(22) PCT Filed: Dec. 21, 2011

(86) PCT No.: PCT/JP2011/007163
§ 371 (c)(1),
(2), (4) Date: Jul. 16, 2013

(87) PCT Pub. No.: WO2012/098621
PCT Pub. Date: Jul. 26, 2012

(65) Prior Publication Data
US 2013/0308825 A1   Nov. 21, 2013

(30) Foreign Application Priority Data

Jan. 17, 2011  (JP) .................................. 2011-006832

(51) Int. Cl.
*G06K 9/00* (2006.01)
*H04N 7/18* (2006.01)

(52) U.S. Cl.
CPC ........... *G06K 9/00771* (2013.01); *H04N 7/18* (2013.01)

(58) Field of Classification Search
USPC ......... 348/14.08, 240.1, 143, 159, 169, 345; 351/240; 353/79; 382/276
See application file for complete search history.

(56) References Cited

U.S. PATENT DOCUMENTS 7,184,609 B2 *  2/2007  Liu et al. ...................... 382/276
7,783,186 B2 *  8/2010  Ishiwata .................. G03B 3/00
                                                      348/345

(Continued)

FOREIGN PATENT DOCUMENTS

CN      101783936       7/2010
JP      2006-215116     8/2006

(Continued)

OTHER PUBLICATIONS

International Search Report, mail date is Apr. 3, 2012.

(Continued)

*Primary Examiner* — Xuemei Chen
(74) *Attorney, Agent, or Firm* — Greenblum & Bernstein, P.L.C.

(57) ABSTRACT

Provided is a captured image recognition device that enables the performance of an image recognition function to be sufficiently evinced. A field-of-view splitting estimation unit (31) estimates the splitting of the field of view of a camera unit (20) using a captured image (S1). On the basis of the estimated splitting of the field of view, a candidate application selection unit (32) selects, from among a plurality of image recognition applications, candidates for an image recognition application that is favorable or able to execute processing with respect to a current captured image. An image recognition processing unit (40) executes the image recognition application selected by a user from among the candidate applications. As a result, the performance of an image recognition function can be sufficiently evinced as a result of it being possible to execute an image recognition application that is suitable to the current captured image.

20 Claims, 9 Drawing Sheets

(56) References Cited

U.S. PATENT DOCUMENTS

| | | | | |
|---|---|---|---|---|
| 8,144,235 B2* | 3/2012 | Mori | | 348/345 |
| 8,149,388 B2* | 4/2012 | Kludas | | G01C 3/08 |
| | | | | 356/139.04 |
| 8,159,343 B2* | 4/2012 | Noguchi | | G08B 13/196 |
| | | | | 340/541 |
| 8,184,157 B2* | 5/2012 | Mittal | | G06T 7/0022 |
| | | | | 348/143 |
| 8,208,028 B2* | 6/2012 | Yamazaki | | 348/169 |
| 8,231,231 B2* | 7/2012 | Okuda | | G03H 1/2294 |
| | | | | 353/122 |
| 8,303,120 B2* | 11/2012 | Hoshino et al. | | 353/79 |
| 8,488,001 B2* | 7/2013 | Mohanty | | G08B 13/19643 |
| | | | | 348/143 |
| 8,525,870 B2* | 9/2013 | Tokumitsu | | 348/14.08 |
| 8,657,444 B2* | 2/2014 | Kawamura | | 351/240 |
| 8,675,065 B2* | 3/2014 | Itoh et al. | | 348/143 |
| 8,896,667 B2* | 11/2014 | Jin | | H04N 13/0271 |
| | | | | 348/42 |
| 9,105,306 B2* | 8/2015 | Ishikawa | | G06K 9/00288 |
| 2003/0117516 A1* | 6/2003 | Ishida | | G06T 7/60 |
| | | | | 348/348 |
| 2005/0270399 A1* | 12/2005 | Kawaguchi | | H04N 5/23212 |
| | | | | 348/333.11 |
| 2007/0035628 A1* | 2/2007 | Kanai | | 348/159 |
| 2008/0136958 A1* | 6/2008 | Nakahara | | H04N 5/23212 |
| | | | | 348/345 |
| 2008/0205869 A1* | 8/2008 | Nose | | G03B 17/20 |
| | | | | 396/77 |
| 2009/0208112 A1* | 8/2009 | Hamamura | | G06K 9/00469 |
| | | | | 382/195 |
| 2010/0277620 A1* | 11/2010 | Iijima et al. | | 348/240.1 |
| 2010/0329565 A1 | 12/2010 | Kunieda | | |
| 2011/0134237 A1* | 6/2011 | Belt | | G06K 9/00771 |
| | | | | 348/135 |
| 2011/0216225 A1* | 9/2011 | Yoshizumi | | H04N 5/228 |
| | | | | 348/240.3 |
| 2011/0285845 A1* | 11/2011 | Bedros | | G06K 9/00255 |
| | | | | 348/143 |

FOREIGN PATENT DOCUMENTS

| | | |
|---|---|---|
| JP | 2009-077092 | 4/2009 |
| JP | 2009-245100 | 10/2009 |
| JP | 2011-008704 | 1/2011 |

OTHER PUBLICATIONS

Nuoyuan Zhang, "Active Target Tracking Based on PTZ Camera," Wangfang Thesis Database, pp. 14, 15 and 19, Sep. 21, 2009, along with a partial English language translation thereof.

English translation of China Office action in China Patent Application No. 201180065235.3, dated Mar. 25, 2015.

* cited by examiner

| | VISUAL FIELD ANGLE OF CAMERA ||
| | SMALL (TELEPHOTO) | LARGE (WIDE ANGLE) |
|---|---|---|
| DISTANCE TO OBJECT FOR IMAGING — NEAR | CORRESPONDING TO P5 IN FIG. 2A | CORRESPONDING TO P3 IN FIG. 2A |
| DISTANCE TO OBJECT FOR IMAGING — DISTANT | CORRESPONDING TO P3 IN FIG. 2A | CORRESPONDING TO P1 IN FIG. 2A |

FIG. 3

CAPTURED IMAGE RECOGNITION DEVICE, CAPTURED IMAGE RECOGNITION SYSTEM, AND CAPTURED IMAGE RECOGNITION METHOD

TECHNICAL FIELD

The present invention relates to a captured-image recognition apparatus, a captured-image recognition system, and a captured-image recognition method, and for example, to an image recognition technique performed by a surveillance camera system and an in-vehicle camera system.

BACKGROUND ART

In recent years, as a technique supporting human visual observation, image recognition techniques using circuits are used in many fields. For example, a surveillance camera system uses an image recognition technique to perform congestion-degree detection, detection of an intruder, or recognition of an intruder's face. In addition, an in-vehicle camera performs traffic lane detection, traffic sign detection, or pedestrian detection, for example.

Camera systems in recent years have many functions in association with diversification of the uses. Camera systems are also proposed which select, from the many functions, a function suitable for the state of a captured image.

For example, a multi-camera system disclosed by Patent Literature 1 selects, from multiple functions, the optimal function suitable for the state of images captured by multiple cameras.

Specifically, when the visual fields of two cameras are overlapped, at least one function is performed among a stereo distance measurement function, a tridimensional-shape measurement function, a panoramic image generation function, a blind-spot-imaging function, and a person action analysis function. On the other hand, when the visual fields of two cameras are not overlapped, objects for detection are detected using respective captured images of the two cameras.

As described above, some conventional camera systems can select and perform a function suitable for the state of a captured image from multiple functions included in the systems to thereby perform the most suitable process for the captured image.

CITATION LIST

Patent Literature

PTL 1
Japanese Patent Application Laid-Open No. 2009-77092

SUMMARY OF INVENTION

Technical Problem

As described above, in camera systems including multiple functions, it is very important to select and perform a function suitable for the state of a captured image from multiple functions in order to obtain a highly precise execution result.

However, about image recognition performed in surveillance camera systems or in-vehicle camera systems, it have not been sufficiently examined which recognition function can be used among multiple image recognition functions to fully utilize the recognition functions included in the systems and obtain a highly precise recognition result.

Especially, the technical development of image recognition has been remarkable, and a large number of image recognition techniques have been developed in recent years. Therefore, it is important to select the optimal image recognition function from among the techniques. However, special knowledge is required in order to manually select the optimal image recognition function. In other words, it is difficult for ordinary camera users to fully elicit the performance of recognition functions. Moreover, a criterion for determining which recognition function is selected for what kind of image has not been fully examined yet. Thus, even if special knowledge is provided, the performance of recognition functions cannot necessarily be elicited fully.

The present invention is made in consideration of the abovementioned points. It is an object of the present invention to provide a captured-image recognition apparatus, a captured-image recognition system, and a captured-image recognition method that can fully elicit the performance of image recognition functions.

Solution to Problem

A captured-image recognition apparatus according to an aspect of the present invention includes: an imaging state estimation section that estimates a visual field ratio of a target size in a captured image to a field-angle size of the captured image; a candidate application selection section that selects at least one candidate of an image recognition application based on the estimated visual field ratio; and an image recognition processing section that executes an image recognition application selected from among the candidate applications.

A captured-image recognition system according to an aspect of the present invention includes: a server apparatus that includes a database storing a plurality of image recognition application programs therein; and a network camera to be connected to the server apparatus in a network, in which: the server apparatus selects a candidate of an image recognition application from among the plurality of stored image recognition application programs, based on a visual field ratio of a target size in an image captured by the network camera to a field-angle size of the captured image; the server apparatus presents information on the selected candidate of the image recognition application to a user of the network camera; and the server apparatus transmits a program for the image recognition application selected by the user to the network camera.

A captured-image recognition method according to an aspect of the present invention includes: an imaging state estimation step of estimating a visual field ratio of a target size in a captured image to a field-angle size of the captured image; a candidate application selection step of selecting at least one candidate of an image recognition application based on the estimated visual field ratio; and an image recognition processing step of executing an image recognition application selected from among the candidate applications.

Advantageous Effects of Invention

The present invention can provide a captured-image recognition apparatus, a captured-image recognition system, and a captured-image recognition method that can fully elicit the performance of image recognition functions.

BRIEF DESCRIPTION OF DRAWINGS

FIG. 2A illustrates the relationship between the captured images and the visual field ratio of the camera, and FIG. 2B is a block diagram illustrating the configuration according to the present embodiment;

FIG. 3 illustrates the relationship among the visual field angle of the camera, a distance from the camera to the object (target) for imaging, and the visual field ratio;

FIG. 5A illustrates availability of equipment resources when one image recognition application is selected, and FIG. 5B illustrates availability of equipment resources when two image recognition applications are selected;

DESCRIPTION OF EMBODIMENTS

The inventors of the present invention have focused attention on the fact that some image recognition functions are suitable for a captured image while others are not suitable for it, depending on the captured image. The inventors have minutely examined what kinds of image recognizing processes are suitable for what kinds of captured images. In addition, the inventors have minutely examined indices for selecting image recognition functions to be applied to captured images.

As a result of the examination, the inventors have found that using a visual field ratio of a target size in the captured image to the field-angle size of the captured image as an index for selecting an image recognizing function makes it possible to perform an image recognizing process suitable for a captured image.

An aspect of the present invention includes; estimating the ratio of a target size in a captured image to the field-angle size of the captured image; selecting at least one candidate of an image recognition application based on the estimated ratio; and executing an image recognition application selected from among the candidate applications.

Figure 1:
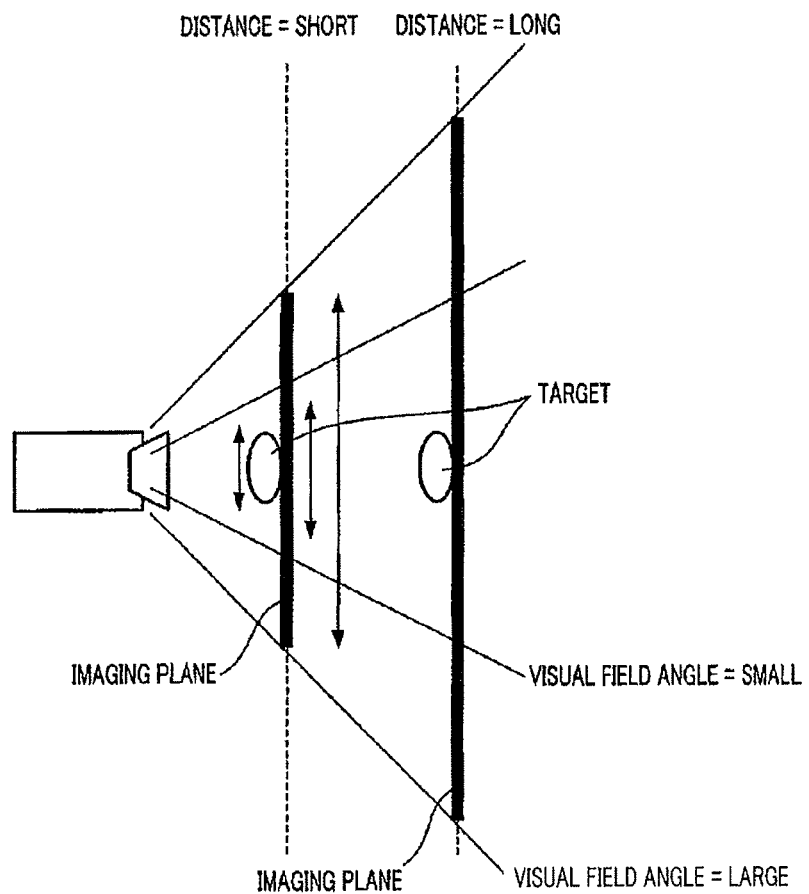
FIG. 1 illustrates the relationship between a distance from a camera to an object for imaging and a visual field ratio.

A method of detecting a ratio of a target size in a captured image to the field-angle size of the captured image is not limited especially. However, the following embodiment describes a method using the visual field ratio of a camera as the ratio. This is based on focusing attention on the general phenomenon of decreasing a ratio of a target size in a captured image to the field-angle size of the captured image with an increase in the visual field angle of a camera, and decreasing the ratio of the size of the target in the captured image to the field-angle size of the captured image with an increase in a distance from the camera to an object for imaging, as illustrated in FIG. 1.

The following embodiment explains an exemplary case where a target for recognition is a person. However, the target may not be a person and may be, for example, a vehicle or other objects.

The embodiment of the present invention will be described in detail with reference to the accompanying drawings.

[1] Configuration

Figure 2:
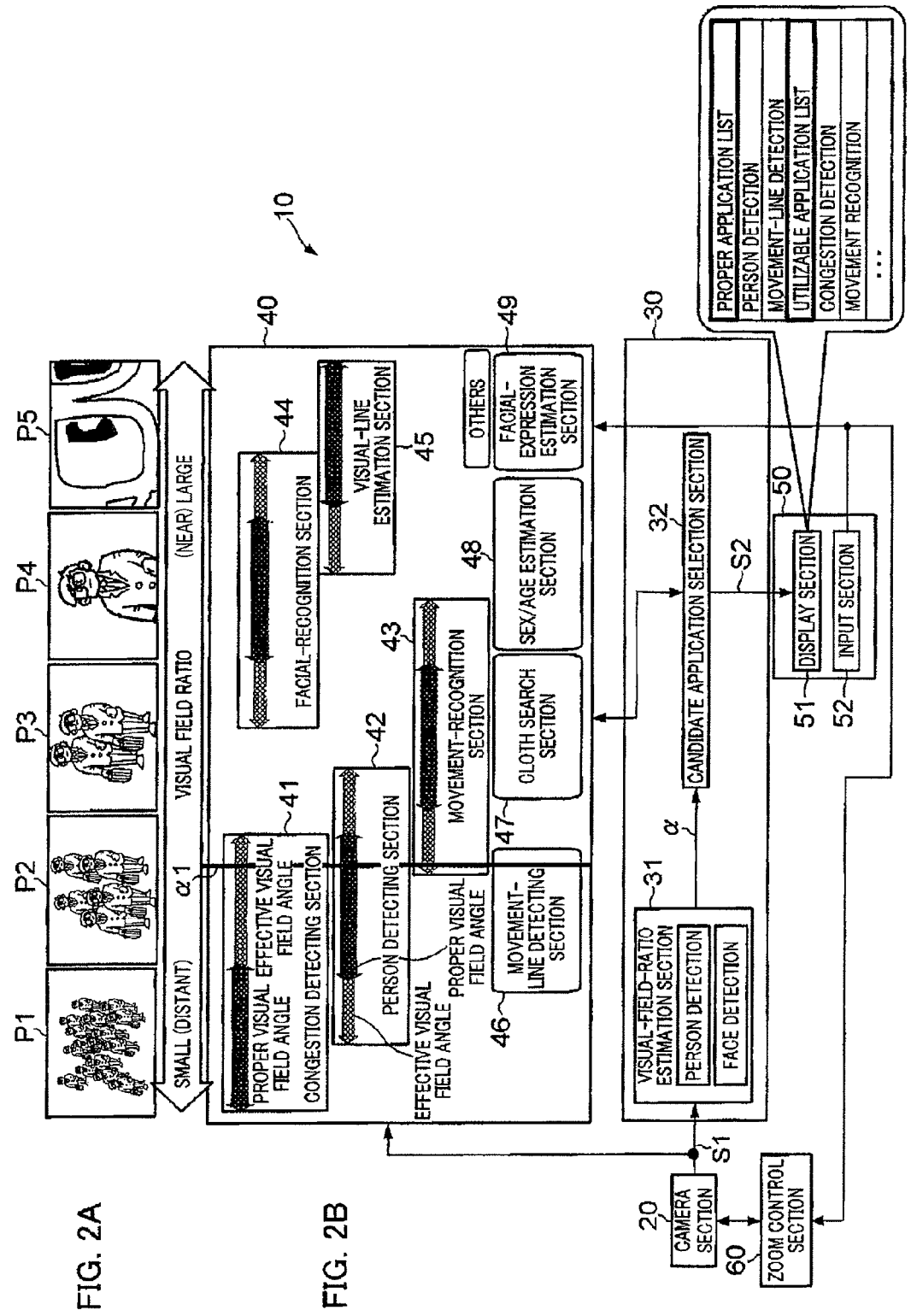
FIGS. 2A and 2B illustrate the configuration of the present embodiment described in association with the visual field ratio of the camera and captured images.

FIGS. 2A and 2B illustrate the configuration of the present embodiment described in association with the visual field ratio of the camera and captured images P1 to P5. FIG. 2A illustrates the relationship between captured images P1 to P5 and the visual field ratio of the camera. FIG. 2B is a block diagram illustrating the configuration according to the present embodiment.

As is apparent from FIG. 2A, the target size (the size of the person appearing in the example of FIG. 2A) in the captured image to the image size of the captured image increases with an increase in the visual field ratio.

FIG. 3 illustrates the relationship among the visual field angle of the camera, a distance from the camera to the object (target) for imaging, and the visual field ratio. As is apparent from the drawing, the visual field ratio for an equal visual field angle increases with a decrease in a distance from the camera.

As illustrated in FIG. 2B, captured image recognition system 10 of the present embodiment includes camera section 20, process selecting section 30, image recognition processing section 40, user terminal 50, and zoom control section 60.

Image recognition processing section 40 is provided in a server apparatus. Alternatively, image recognition processing section 40 may be provided in camera section 20. Process selecting section 30 is provided in the server apparatus. Alternatively, process selecting section 30 may be provided in camera section 20 or user terminal 50.

Image recognition processing section 40 holds multiple application programs (hereinafter also referred to as application simply) for implementing multiple image recognition functions, and executes an image recognition application selected by a user from among the multiple image recognition applications.

In the present embodiment, image recognition processing section 40 stores applications performing congestion detection, person detection, movement recognition, facial recognition, visual-line estimation, movement-line detection, cloth search, sex/age estimation, and facial-expression estimation as the image recognition applications, and executes the respective applications in congestion detecting section 41, person detecting section 42, movement-recognition section 43, facial-recognition section 44, visual-line estimation section 45, movement-line detecting section 46, cloth search section 47, sex/age estimation section 48, and facial-expression estimation section 49.

Each application includes a set visual field ratio suitable for the operation of the application. The set visual field ratio is beforehand determined based on, for example, experiments or the property of application. Alternatively, a suitable visual field ratio varies depending on the resolution of the camera and may therefore be changed appropriately depending on resolution information on the camera. For example, since the face of the person can be electronically expanded if the resolution is high even in the case of a low visual field ratio as illustrated in P2 of FIG. 2A, the proper range of facial-recognition section 44 may be extended in the direction in which the visual field ratio decreases.

Process selecting section 30 selects a candidate of an image recognition application which is properly executable for the current captured image from among multiple image recognition applications which are executable in image recognition processing section 40, and presents these candidate applications to the user.

Process selecting section 30 receives captured image S1 from camera section 20 at visual-field-ratio estimation section 31. Visual-field-ratio estimation section 31 estimates the visual field ratio of camera section 20 using captured image S1. In present embodiment, visual-field-ratio estimation section 31 performs a person detecting process and a face detecting process, and estimates the visual field ratio based on the detected person size and face size. For example, the visual field ratio can be estimated based on the person size and face size relative to field-angle size of captured image S1. Specifically, the visual field ratio may be estimated to be smaller for a lower ratio of the person size or face size to the field-angle size.

However, how a visual field ratio is estimated is not restricted to this method. For example, a person detecting process and a face detecting process may be performed to estimate a visual field ratio based on the degree of success or failure of each detecting process. For example, a visual field ratio $\alpha$ may be estimated to be small for a higher success rate of the person detection and to be large for a higher success rate of the face detection.

Moreover, person detecting processes using multiple templates having different sizes may be performed to estimate a visual field ratio based on the degrees of success or failure of the detecting processes using the respective sizes. For example, by using three templates having respective large, medium, and small sizes, a visual field ratio may be estimated to be larger for a higher success rate of the person detection with the large template and to be smaller for a higher success rate of the person detection with the small template.

For example, visual-field-ratio estimation section 31 may also estimate a visual field ratio based on a parameter from camera section 20. Specifically, the visual field ratio can be found from information on the visual field angle of the camera and information on a positional relationship (distance) between the camera and the target, by using the relationship illustrated in FIG. 1.

Estimated visual field ratio $\alpha$ is sent to candidate application selection section 32. Application selection section 32 selects a candidate of an image recognition application based on visual field ratio $\alpha$. A candidate of an image recognition application is defined as an image recognition application which is properly executable for the current captured image among multiple image recognition applications which are executable in image recognition processing section 40.

FIG. 2B illustrates which image recognition application is suitable for which visual field ratio. The exemplary case of the drawing illustrates that image recognition application processes suitable for visual field ratio $\alpha 1$ are congestion detection, person detection, movement recognition, and movement-line detection. Therefore, candidate application selection section 32 selects, for visual field ratio $\alpha 1$, congestion detection, person detection, movement recognition, and movement-line detection as the candidates of image recognition applications.

In the above description, the zoom magnification of the camera is fixed. However, when the zoom magnification is variable, the visual field ratio also varies as the visual field angle of the camera is changed. FIG. 2B illustrates visual field ratio $\alpha 1$ indicated by a straight line. However, when the zoom magnification of the camera is variable, $\alpha 1$ may be indicated by a straight line having a width in the right and left direction, the width corresponding to the zoom range.

The information on the candidate application selected by candidate application selection section 32 of process selecting section 30 is sent to display section 51 of user terminal 50 as proper process recommendation information S2. Thereby, the candidates of the image recognition applications which are properly executable in image recognition processing section 40 are displayed for the current captured image on display section 51, and the user can select, from among the candidates, an image recognition application which the user intends to execute.

In addition to selecting candidate applications, candidate application selection section 32 may display the rankings of the selected candidate applications. That is, as illustrated in FIG. 2B, each image recognition application includes an effective visual field ratio in a visual field region which allows an intended application to be executed, and a proper visual field ratio in a visual field region which allows the application to be executed more properly in the effective visual field ratio. The proper visual field ratio is included in the range of a part of the effective visual field ratio.

Candidate application selection section 32 may judge whether the selected candidate application is a merely executable application or a properly executable application, and cause display section 51 to display the result. For example, a merely executable application may be displayed in a "utilizable application list," and an application which can be more properly performed may be displayed in a "proper application list."

In practice, the user selects an image recognition application that he or she wishes to execute, while browsing image recognition applications displayed on display section 51, and inputs the selection result through input section 52. The information on the selected image recognition application is sent out to image recognition processing section 40. Image recognition processing section 40 then executes the image recognition application selected by the user.

The information on the image recognition application selected by the user is also sent to zoom control section 60. Zoom control section 60 controls the zooming (focal length) so that the visual field ratio of camera section 20 can be optimal for the selected image recognition application. For example, when congestion detection is selected by the user as an image recognition application under visual field ratio $\alpha 1$ as illustrated in FIG. 2B, a visual field ratio smaller than $\alpha 1$ is more preferred for congestion detection. Therefore, zoom control section 60 controls the zooming so that the visual field ratio (visual field angle) can be smaller than its current value.

[2] Operations of Captured-Image Recognition System

Figure 4:
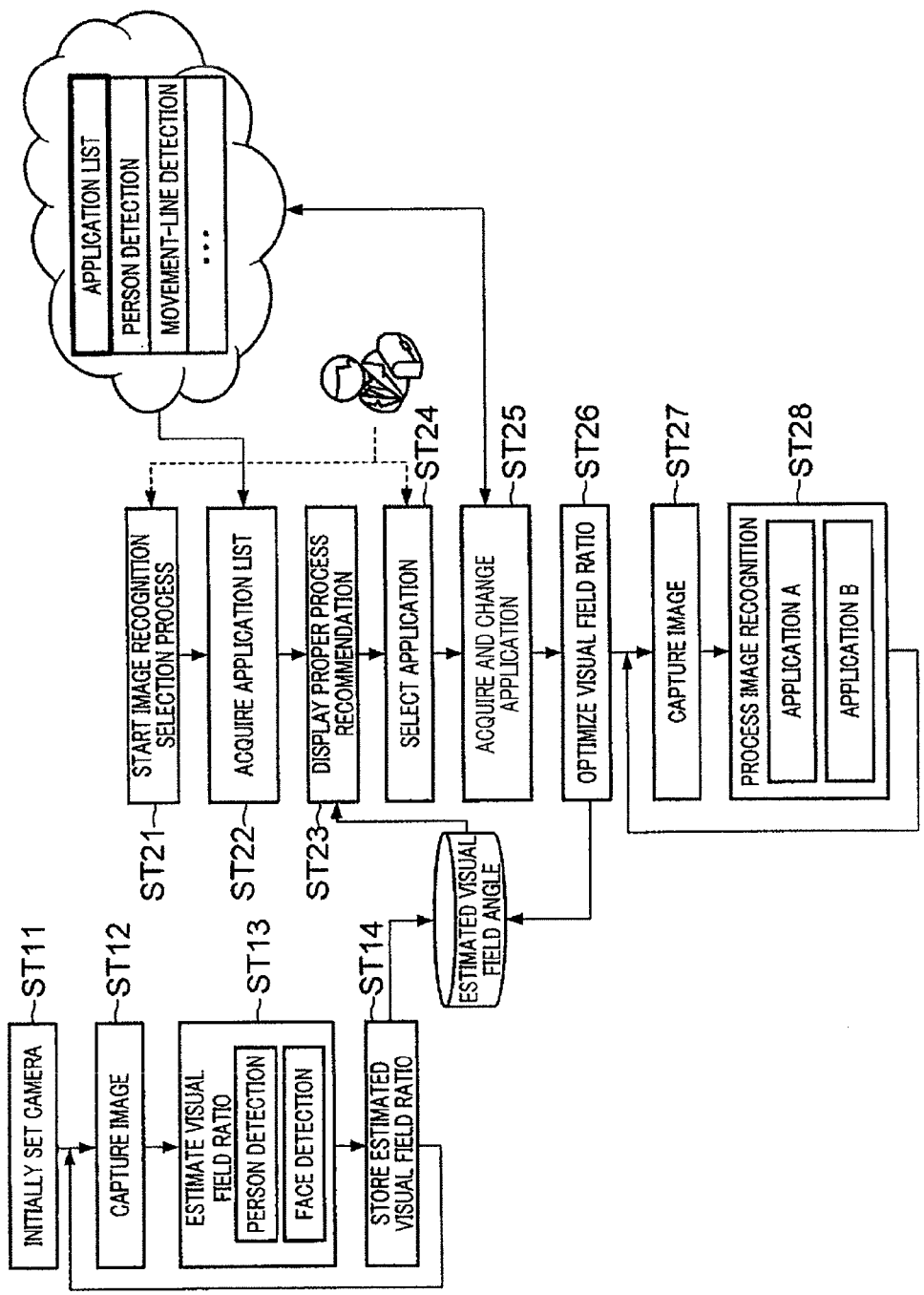
FIG. 4 is a flow chart for explaining operations of a captured-image recognition system.

Next, operations of captured-image recognition system 10 will be described with reference to FIG. 4.

First, initial setting for camera section 20 is performed at step ST11. At step ST12, camera section 20 captures an image. At step ST13, visual-field-ratio estimation section 31 estimates visual field ratio $\alpha$. In step ST14, the estimated visual field ratio $\alpha$ is stored. Estimated visual field ratio $\alpha$ may be stored, for example, in a memory provided in visual-field-ratio estimation section 31.

Meanwhile, captured-image recognition system 10 starts an image recognition selection process at step ST21. First, candidate application selection section 32 acquires a list of image recognition applications from image recognition processing section 40 at step ST22. The list of image recognition applications is a list of the image recognition applications executable in image recognition processing section 40. In the example of FIG. 2B, the image recognition application list includes congestion detection, person detection, movement recognition, facial recognition, visual-line estimation, movement-line detection, cloth search, the sex/age estimation, and facial-expression estimation.

At step ST23, candidate application selection section 32 selects at least one or more image recognition applications suitable for current visual field ratio α from the image recognition application list, and causes display section 51 to display the selected image recognition applications as a "candidate application." In the example of FIG. 2B, since an image is captured with visual field ratio α1, display section 51 displays that congestion detection, person detection, movement recognition, and movement-line detection are executable.

At step ST24, an image recognition application is selected by the user using input section 52.

At step ST25, in order for image recognition processing section 40 to execute an image recognition application selected by the user, an image recognition application program is acquired from the outside of the system through a network, or a module is changed to the selected image recognition application program when the programs are held beforehand.

At step ST26, zoom control section 60 controls the zoom of camera section 20 so as to set a visual field ratio optimal for the image recognition application selected by the user.

At step ST27, camera section 20 captures an image.

At step ST28, image recognition processing section 40 performs an image recognition process with the image recognition application selected by the user.

[3] Display of Equipment Resource Availability

In this embodiment, it is preferable to cause display section 51 to display availability of an equipment resource in addition to candidate applications because the user can use the information as an index for selecting an image recognition application.

Figure 5A:
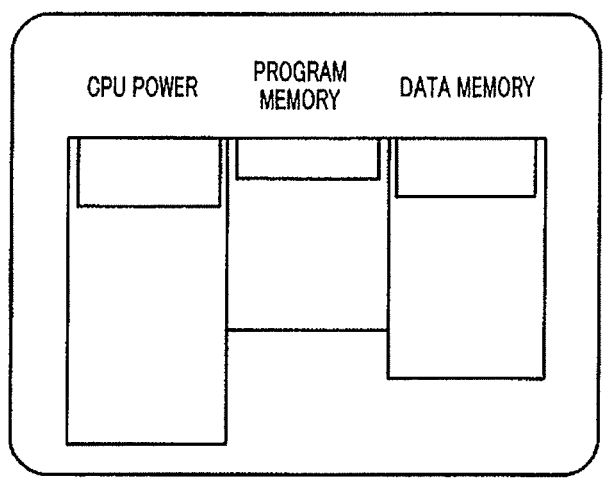
FIGS. 5A and 5B illustrate an example display of availability of equipment resources.
Figure 5B:
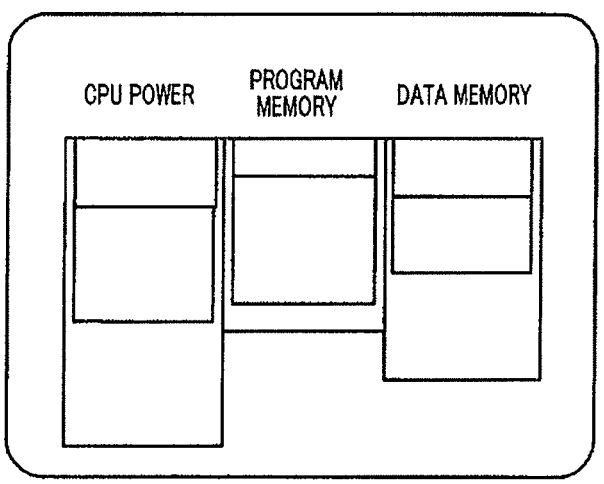

FIGS. 5A and 5B illustrate an example display of availability of equipment resources. FIG. 5A illustrates availability of equipment resources when one image recognition application is selected (for example, when person detection is selected). FIG. 5B illustrates availability of equipment resources when two image recognition applications are selected (for example, when person detection and movement-line detection are selected). The user can view availability of equipment resources to thereby find the remaining quantity of an equipment resource. This can be used as an index for selecting an image recognition application.

Figure 6:
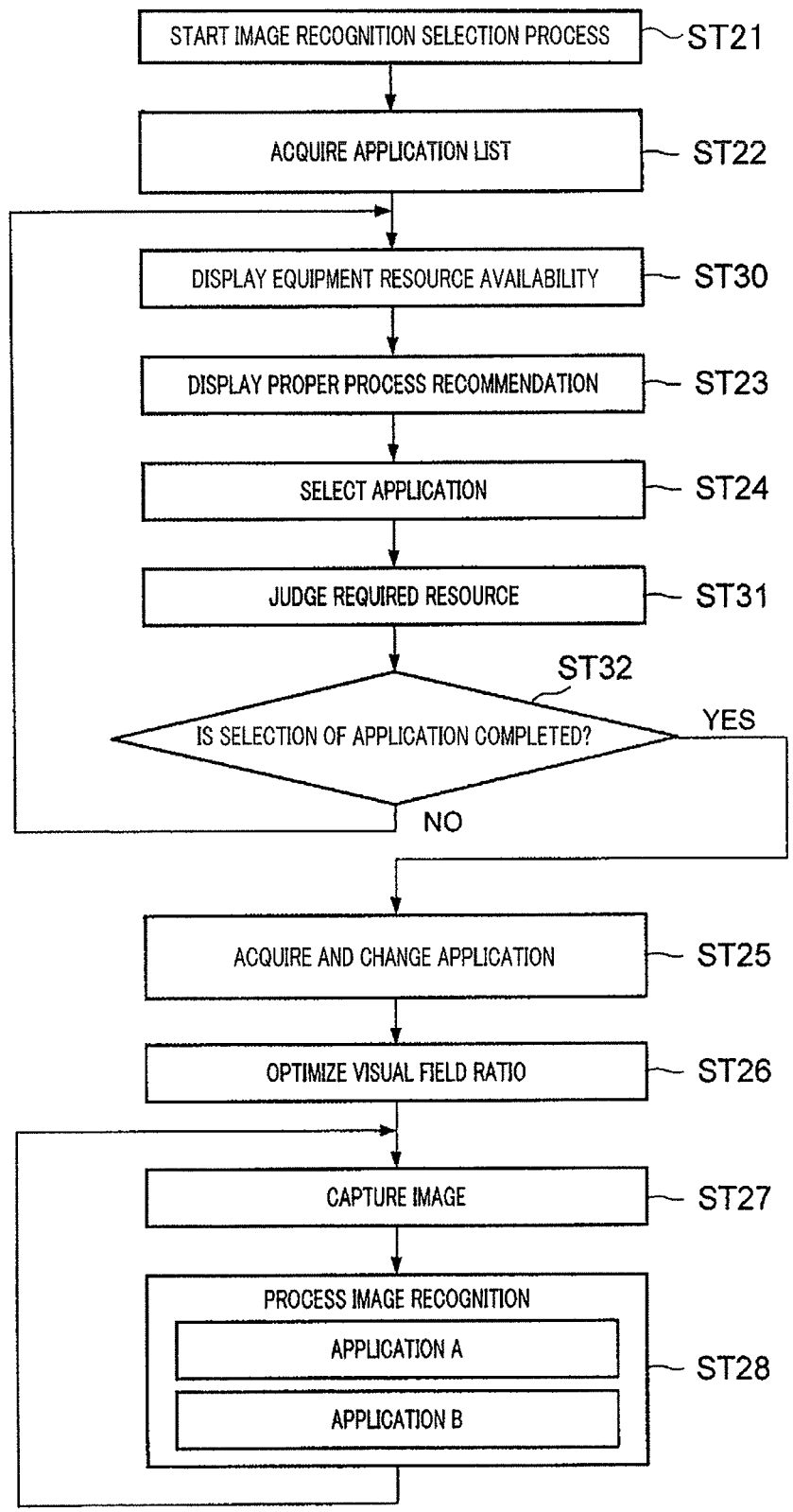
FIG. 6 is a flow chart for illustrating a procedure for performing the display of availability of an equipment resource.

FIG. 6 illustrates a procedure for performing the display of availability of an equipment resource. In FIG. 6, the same processes as those in FIG. 4 are assigned the same reference signs as those in FIG. 4. The procedure in FIG. 6 is configured by adding steps ST30, ST31, and ST32 to the procedure in FIG. 4.

At step ST30, the availability of equipment resources is displayed as illustrated in FIG. 5. Step ST31 judges a resource required to execute the image recognition application selected at Step ST24. This judgment may be made by, for example, candidate application selection section 32 sending a query to image recognition processing section 40 (for example, a server). In step ST32, whether or not selection of application is completed is judged. If the selection is not completed (step ST32; No), the process returns to step ST30. In step ST30, the availability of an equipment resource obtained by adding the required resource judged at Step ST31 is displayed in addition to the resource processed at previous step ST30. That is, if the contents displayed at previous step ST31 are something like FIG. 5A, the contents displayed in step ST31 will be something like FIG. 5B.

[4] Network Configuration

Next, a favorable network configuration of captured-image recognition system 10 will be described with reference to FIG. 7 and FIG. 8. Here, elements corresponding to those in FIG. 2B are assigned the same reference signs in FIG. 7 and FIG. 8.

Figure 7:
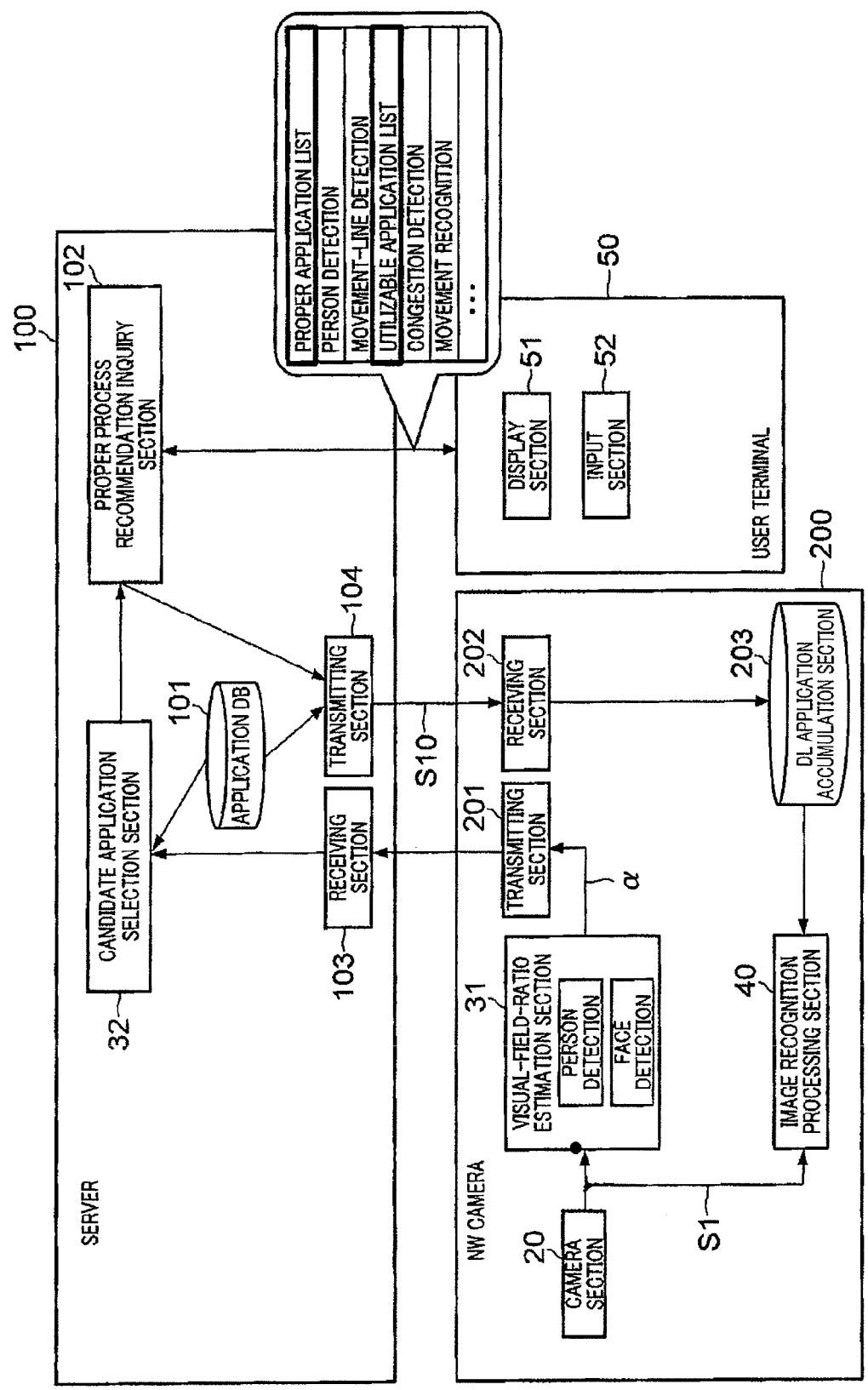
FIG. 7 is a block diagram for illustrating an example network configuration according to the present embodiment.

The network configuration in FIG. 7 is an example configuration in which a network camera downloads and uses an image recognition application program through a network.

The network configuration in FIG. 7 includes server 100, network camera (NW camera) 200 connected to server 100 in a network, and user terminal 50. User terminal 50 may be provided in network camera 200, may be provided in server 100, or may be provided independently of network camera 200 and server 100. However, user terminal 50 need be linked with network camera 200 in order to be provided independently.

Server 100 includes candidate application selection section 32, application database (application DB) 101 storing image recognition application programs, proper process recommendation query section 102, receiving section 103, and transmitting section 104.

Network camera 200 includes camera section 20, visual-field-ratio estimation section 31, image recognition processing section 40, transmitting section 201, receiving section 202, and download application accumulation section (DL application accumulation section) 203.

After camera section 20 obtains captured image S1, visual-field-ratio estimation section 31a estimates and then transmits visual field ratio α to server 100 through transmitting section 201.

Server 100 receives visual field ratio α through receiving section 103. Candidate application selection section 32 selects candidates of image recognition applications based on visual field ratio α and sends the selected candidates of image recognition applications to proper process recommendation query section 102. Processing recommendation query section 102 causes display section 51 of user terminal 50 to display the selected candidates of image recognition applications. Moreover, proper process recommendation query section 102 receives information on an image recognition application selected by the user, from input section 52 of user terminal 50 and transmits the image recognition application program selected by the user to network camera 200 through transmitting section 104.

Network camera 200 receives the image recognition application program by receiving section 202 and accumulates the received program in download application accumulation section 203. Image recognition processing section 40 performs an image recognition process using the image recognition application program downloaded in download application accumulation section 203.

Figure 8:
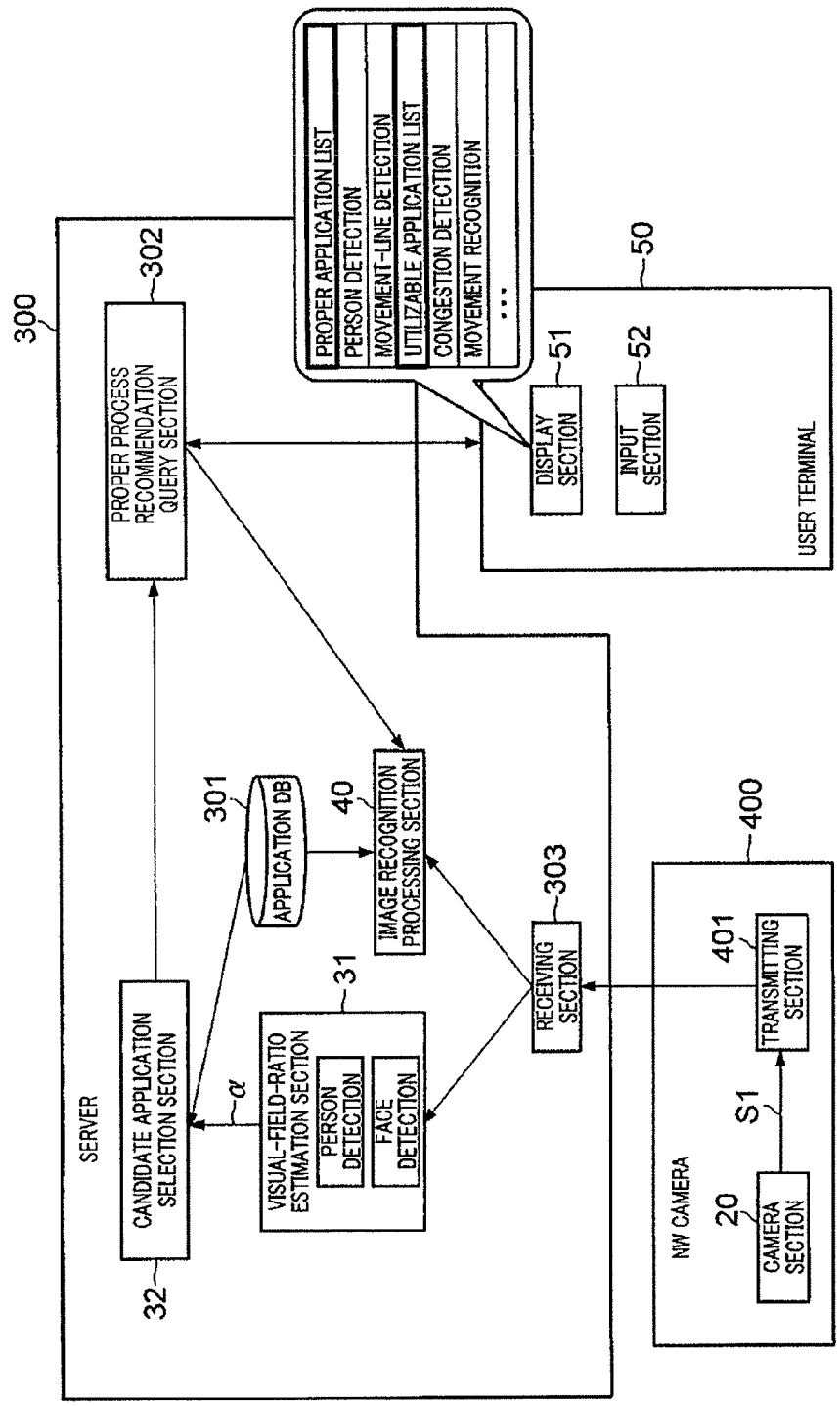
FIG. 8 is a block diagram for illustrating another example network configuration according to the present embodiment.

In the example network configuration of FIG. 8, the network camera captures an image, and the server performs almost all of the other processes.

In the configuration of FIG. 8, network camera 400 transmits captured image S1 obtained by camera section 20 to server 300 through transmitting section 401.

Server 300 receives captured image S1 at receiving section 303, and inputs the received image to visual-field-ratio estimation section 31 and image recognition processing section 40. Visual-field-ratio estimation section 31 estimates visual field ratio α, and candidate application selection section 32 selects candidates of image recognition applications suitable for visual field ratio α. Processing recommendation query section 302 causes display section 51 of user terminal 50 to display the selected candidates of image recognition applications. Moreover, proper process recommendation query section 302 receives information on an image recognition application selected by the user, from input section 52 of user terminal 50, and sends this information to image recognition processing section 40. Image recognition processing section 40 reads the image recognition application program selected by the user from application database (application DB) 301, and performs an image recognition process on captured image S1 using this image recognition application program.

[5] Example Applications

Example applications (business models) implementable by applying the configuration of the present invention will be described.

When multiple image recognition application programs are sold as packaging software, users have to single-handedly select an image recognition application program considered to be suitable for, for example; how a camera is mounted, from multiple image recognition application programs, and has to perform performance evaluation of image recognition. If a user selects a wrong image recognition application program at this time, the performance of the image recognition cannot be evaluated in the optimal combination of the mounted camera and the prepared image recognition application program.

In contrast to this, by using the configuration of the present embodiment, the users of a camera just need to purchase packaging software including multiple image recognition application programs, and an image recognition application program suitable for the camera is selected by visual-field-ratio estimation section 31 and candidate application selection section 32 without the need for users to select the image recognition application program suitable for the camera. Consequently, the performance evaluation using the image recognition application program suitable for the current camera state can be performed. As a result, for example, a user planning the purchase of a camera and an image recognition application program can consider the performance evaluation suitable for the camera state as the index of the purchase.

Figure 9A:
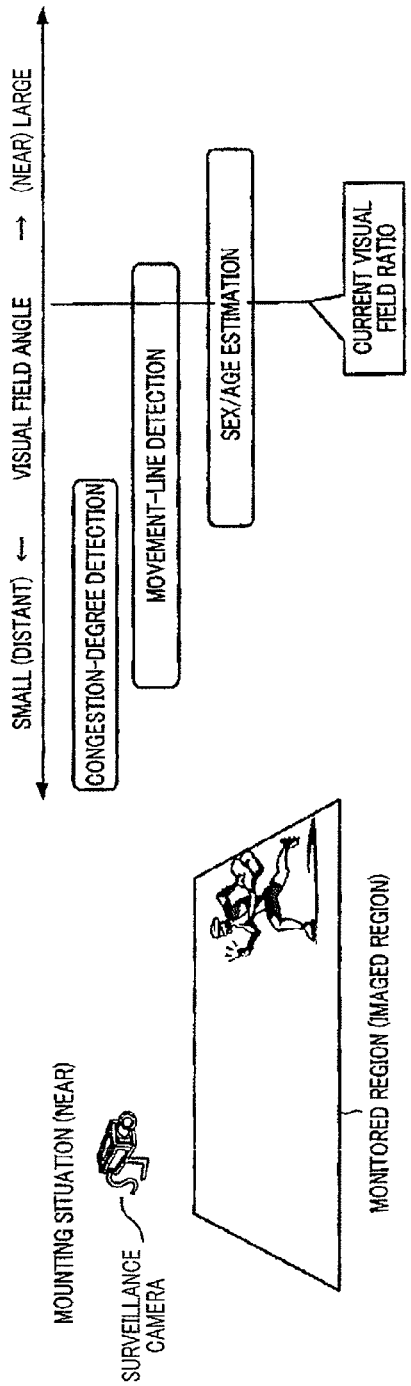
FIG. 9A illustrates an example process where a surveillance camera is mounted at a position near a monitored region.
Figure 9B:
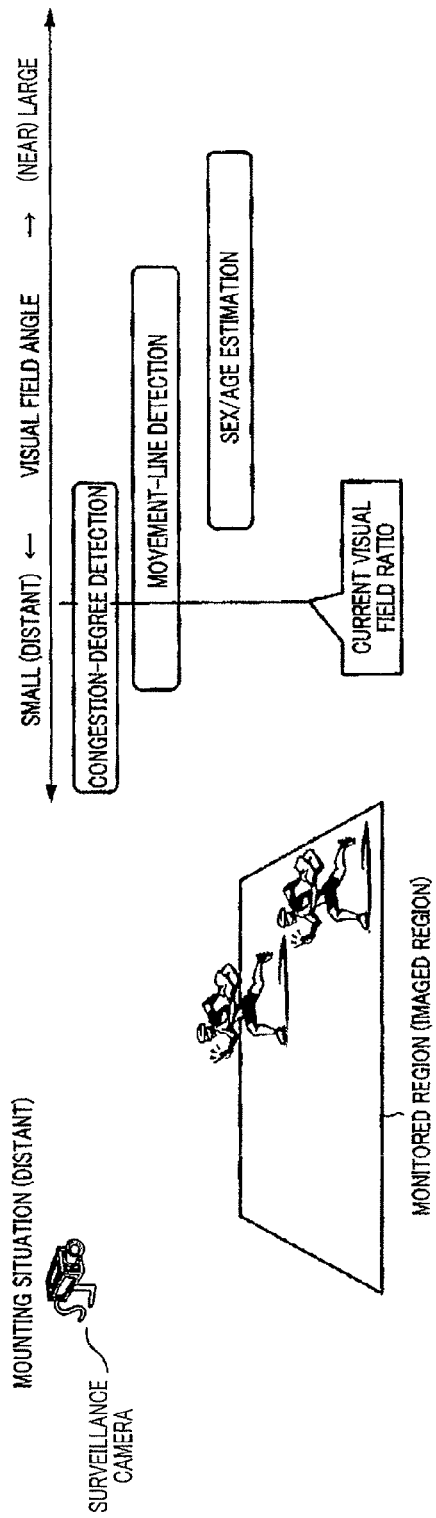
FIG. 9B illustrates an example process where a surveillance camera is mounted at a position distant from a monitored region.

FIGS. 9A and 9B illustrate examples in which the processes of the present embodiment are applied to packaging software including image recognition applications for congestion-degree detection, movement-line detection, and the sex/age estimation.

FIG. 9A illustrates a case where a surveillance camera is mounted at a position near a monitored region (imaged region). At this time, based on a visual field ratio, image recognition applications for movement-line detection and the sex/age estimation are selected and executed.

FIG. 9B illustrates a case where a surveillance camera is mounted at a position distant from a monitored region (imaged region). At this time, based on a visual field ratio, image recognition applications for congestion-degree detection and movement-line detection are selected and executed.

[6] Advantageous Effects

As described above, the present embodiment includes visual-field-ratio estimation section 31, candidate application selection section 32 configured to select candidates of image recognition applications based on an estimated visual field ratio, and image recognition processing section 40 configured to execute an image recognition application selected by a user from the candidate applications. Thereby, the image recognition application suitable for the current captured image can be presented to a user and causes the user to execute a proper image recognition application. Accordingly, the performance of the image recognition function can be sufficiently elicited.

In addition, process selecting section 30 in the above-described embodiment can be constituted by a computer such as a personal computer including a memory and CPU. The function of each component constituting process selecting section 30 can be implemented by the CPU reading and executing a computer program stored on the memory.

The disclosure of Japanese Patent Application No. 2011-006832, filed on Jan. 17, 2011, including the specification, drawings and abstract, is incorporated herein by reference in its entirety.

INDUSTRIAL APPLICABILITY

The present invention is suitable for a case where an image recognition process is applied to an image captured by a camera such as a surveillance camera and an in-vehicle camera.

REFERENCE SIGNS LIST

10 Captured-image recognition system
20 Camera section
30 Process selecting section
31 Visual-field-ratio estimation section
32 Candidate application selection section
40 Image recognition processing section
41 Congestion detecting section
42 Person detecting section
43 Movement-recognition section
44 Facial-recognition section
45 Visual-line estimation section
46 Movement-line detecting section
47 Cloth search section
48 Sex/age estimation section
49 Facial-expression estimation section
50 User terminal
51 Display section
52 Input section
60 Zoom control section
100, 300 Server
200, 400 Network camera
S1 Captured image
S2 Proper process recommendation information
α, α1 Visual field ratio

The invention claimed is:

1. A captured-image recognition apparatus comprising:
a memory that stores instructions; and
a processor that, when executing the instructions stored in the memory, performs a process comprising:
estimating a visual field ratio of a target in a captured image, using at least two kinds of detecting methods that detect different kinds of targets, the visual field ratio being a ratio of a target size in the captured image to a field-angle size of the captured image;

selecting, based on the estimated visual field ratio, at least one candidate image recognition application from a plurality of image recognition applications that recognize different kinds of targets;

performing image recognition by executing an image recognition application selected from among the at least one candidate image recognition application; and optimizing the visual filed ratio based upon the selected image recognition application.

2. The captured-image recognition apparatus according to claim 1, wherein,
in the estimating, the processor extracts a target in the captured image by the detecting methods.

3. The captured-image recognition apparatus according to claim 1, wherein
the detecting methods include person detection that detects a person from the captured image, and face detection that detects a face from the captured image, and
in the estimating, the processor estimates the visual field ratio based on the person detection result and the face detection result.

4. The captured-image recognition apparatus according to claim 3, wherein,
in the estimating, the processor estimates the visual field ratio to be smaller for a higher success rate of the person detection.

5. The captured-image recognition apparatus according to claim 3, wherein,
in the estimating, the processor estimates the visual field ratio to be larger for a higher success rate of the face detection.

6. The captured-image recognition apparatus according to claim 3, wherein,
in the estimating, the processor performs the person detection using multiple templates having different sizes and estimates the visual field ratio based on degrees of success or failure of the person detection using the respective sizes.

7. The captured-image recognition apparatus according to claim 1, wherein:
the image recognition applications are set with proper visual field ratios, respectively; and
in the selecting, the processor selects the image recognition application based on the proper visual field ratio set for each of the image recognition applications and the estimated visual field ratio.

8. The captured-image recognition apparatus according to claim 1, wherein,
in the selecting, the processor selects an image recognition application in consideration of a zoom range of an imaging apparatus configured to take the captured image.

9. The captured-image recognition apparatus according to claim 1, wherein,
in the selecting, the processor selects, as the at least one candidate image recognition application, at least one of a congestion detection application, a person detection application, a movement-recognition application, a facial-recognition application, a visual-line estimation application, a movement-line detection application, a cloth search application, a sex estimation application, an age estimation application, and a facial-expression estimation application.

10. The captured-image recognition apparatus according to claim 1, wherein, the at least one candidate image recognition application selected in the selecting includes a facial-recognition application, when the estimated visual field ratio is greater than a first predetermined value; and the at least one candidate image recognition application selected in the selecting includes a person detection application when the estimated visual field ratio is smaller than a second predetermined value, and
the executing executes the facial-recognition application, when the estimated visual field ratio is greater than the first predetermined value, and executes the person detection application when the estimated visual field ratio is smaller the second predetermined value.

11. The captured image recognition apparatus according to claim 1, wherein in the estimating, the processor extracts a target in the captured image by the detecting methods, and estimates the visual field ratio based on a visual field angle of a camera and a positional relationship between the camera and the target.

12. The captured image recognition apparatus according to claim 1, further comprising storing the estimated visual field ratio and updating the stored estimated visual field ratio based on the optimized visual field ratio.

13. The captured image recognition apparatus according to claim 1, wherein each of the plurality of image recognition applications corresponds to a range of visual field ratios.

14. A server apparatus comprising:
a first memory that stores a database comprising a plurality of image recognition applications that recognize different kinds of targets; and
a captured-image recognition apparatus,
the captured-image recognition apparatus comprising:
a second memory that stores instructions; and
a processor that, when executing the instructions stored in the second memory, performs a process comprising:
estimating a visual field ratio of a target in a captured image, using at least two kinds of detecting methods that detect different kinds of targets, the visual field ratio being a ratio of a target size in the captured image to a field-angle size of the captured image;
selecting, based on the estimated visual field ratio, at least one candidate image recognition application from the plurality of image recognition applications;
performing image recognition by executing an image recognition application selected from among the at least one candidate image recognition application; and
optimizing the visual filed ratio based upon the selected image recognition application.

15. A captured-image recognition system comprising:
a server apparatus that includes a first memory storing a database comprising a plurality of image recognition applications that recognize different kinds of targets, a second memory storing instructions, and a processor executing the instructions stored in the second memory; and
a network camera connected to the server apparatus in a network,
wherein:
the processor selects at least one candidate image recognition application from the plurality of image recognition applications, based on a visual field ratio of a target detected by using at least two detecting methods, the at least two detecting methods detecting different kinds of the targets in an image captured by the network camera, the visual field ratio being estimated as a ratio of a target size in the captured image to a field-angle size of the captured image, and the visual field ratio being optimized based on the selected at least one candidate image recognition application;

the processor presents information on the selected at least one candidate image recognition application to a user of the network camera;

the processor transmits a program for an image recognition application selected by the user to the network camera; and the network camera performs an image recognition process by executing the program for the image recognition application selected by the user, wherein, the at least one candidate image recognition application selected by the processor includes a facial-recognition application, when the estimated visual field ratio is greater than a first predetermined value; and the at least one candidate image recognition application selected by the processor includes a person detection application when the estimated visual field ratio is smaller than a second predetermined value.

16. A captured-image recognition method comprising:

estimating a visual field ratio of a target in a captured image using at least two kinds of detecting methods that detect different kinds of targets, the visual field ratio being a ratio of a target size in the captured image to a field-angle size of the captured image;

selecting at least one candidate image recognition application corresponding to the estimated visual field ratio, from a plurality of image recognition applications that recognize different kinds of targets;

performing image recognition by executing an image recognition application selected from the at least one candidate image recognition application; and optimizing the visual field ratio based upon the selected image recognition application, wherein, the at least one candidate image recognition application selected in the selecting includes a facial-recognition application, when the estimated visual field ratio is greater than a first predetermined value; and the at least one candidate image recognition application selected in the selecting includes a person detection application when the estimated visual field ratio is smaller than a second predetermined value, and the executing executes the facial-recognition application, when the estimated visual field ratio is greater than the first predetermined value, and executes the person detection application when the estimated visual field ratio is smaller than the second predetermined value.

17. The captured image recognition method according to claim 16, wherein each of the plurality of image recognition applications corresponds to a range of visual field ratios.

18. A non-transitory computer readable recording medium storing a program that causes a computer to execute a process comprising:

estimating a visual field ratio of a target in a captured image using at least two kinds of detecting methods that detect different kinds of targets, the visual field ratio being a ratio of a target size in the captured image to a field-angle size of the captured image;

selecting at least one candidate image recognition application corresponding to the estimated visual field ratio, from a plurality of image recognition applications that recognize different kinds of targets;

performing image recognition by executing an image recognition application selected from the at least one candidate image recognition application; and optimizing the visual field ratio based upon the selected image recognition application.

19. The non-transitory computer readable according medium according to claim 18, wherein, the at least one candidate image recognition application selected in the selecting includes a facial-recognition application, when the estimated visual field ratio is greater than a first predetermined value; and the at least one candidate image recognition application selected in the selecting includes a person detection application when the estimated visual field ratio is smaller than a second predetermined value, and the executing executes the facial-recognition application, when the estimated visual field ratio is greater than the first predetermined value, and executes the person detection application when the estimated visual field ratio is smaller than the second predetermined value.

20. The non-transitory computer readable recording medium according to claim 18, further comprising storing the estimated visual field ratio and updating the stored estimated visual field ratio based upon the optimized visual field ratio.

* * * * *